3,418,935
INK TRANSFER MEMBER

Dolor N. Adams, Cleveland Heights, Ohio, assignor to Harris-Intertype Corporation, Cleveland, Ohio, a corporation of Delaware
No Drawing. Continuation of application Ser. No. 221,905, Sept. 6, 1962. This application July 18, 1966, Ser. No. 565,683
21 Claims. (Cl. 101—348)

The present invention relates to an improved ink-transfer member and, more particularly, to a supporting body having the ink-attractive properties of a surface enhanced by the presence of a reaction product of a polymeric ion-exchange resin. Such a body may comprise a roller, blanket, or other article by which it is desired to transfer ink. The present invention is particularly suitable for use in lithographic applications.

This application is a continuation of application, Ser. No. 221,905, filed Sept. 6, 1962, which is a continuation-in-part of Ser. No. 260,304, filed Dec. 6, 1951 (now abandoned), and Ser. No. 614,098, filed Oct. 5, 1956, now forfeited.

In printing presses, important elements in the mechanism include the rolls for transferring and applying ink. In letterpress printing, the rolls are commonly of glue-glycerin composition. In lithographic printing it has been common to employ resilient or soft rolls made of vulcanized glyceride oils. Also there has been wide use of hard rolls of steel or copper-coated steel, suitably grained to pick up and carry ink, as well as synthetic rubber rolls. All of these, while giving practical service, have been characterized by deficiencies, which have been assumed to be inevitable, particularly in lithographic rolls where a tendency toward ink-stripping, due to the complicating dampening water application, has been a more or less serious drawback. Furthermore, in the case of small abrasions or damages to the surface, it has been necessary to discard the whole roll. In accordance with the present invention, rolls now become possible which have a remarkable affinity for ink, while at the same time being wholly unaffected by dampening water usage.

It is, therefore, a principal object to provide an improved ink-transfer member.

Another object is to provide a roller, blanket, and the like for lithographic printing applications, wherein it is desired to transfer ink, such roller having at a surface thereof a polymeric ion-exchange resin or reaction product thereof to enhance the ink-attratcive qualities of the roller.

A further object is to provide such a roller blanket, or other ink-transfer article in which both cationic and anionic-exchange resins may be employed.

Other objects of the invention will become apparent as the description proceeds.

To the accomplishment of the foregoing and related ends, the invention consists of the features hereinafter fully described and particularly pointed out in the claims, the following disclosure describing in detail the invention, such disclosure illustrating, however, but one or more of the various ways in which the invention may be practiced.

The invention contemplates an ink-transfer member having enhanced hydrophobic and oleophilic properties containing at least at one surface, intended to transfer the ink, a reaction product of a polymeric ion-exchange resin. Both anionic and cationic-exchange resins are usable. Anionic-exchange resins within the contemplation of the invention are the so-called amine resins, that is, noncellulosic anionic-exchange amine resins having nitrogen-containing basic groups. Cationic resins within the contemplation of the invention are those water-attractive cationic-exchange polymers having reactive acid groups. Such polymers, except possibly for the acid groups, are composed only of carbon, hydrogen, and oxygen. The preferred acid groups include carboxyl, sulfonic and phosphoric acid groups.

For the present purpose, anionic-exchange resins are preferred since, as hereinafter described, these resins react directly with fatty acids in printing inks immediately to provide the desired ink-loving surface; whereas the cationic-exchange resins must first undergo an additional treatment by reaction with an amine before such resins provide the ink-retentive properties desired.

Many anionic and cationic-exchange resins meeting the foregoing descriptions are known in the art, although the novel applications as herein described and claimed have not been suggested. In this regard, it is emphasized that although the terms "anionic-exchange" and "cationic-exchange" correctly describe and indicate the resins contemplated, these resins in the present ink-transfer members do not perform an ion-exchange function in the manner such resins were heretofore employed by the prior art, such as to remove metal ions from a solution. Rather the defined resins are used in ink-transfer members because of the ink-attractiveness imparted thereto.

Because of the vast number of anionic and cationic-exchange resins which may be employed, it is not practical nor, in fact, necessary to categorize the nature of the residue or bulk of the ion-exchange resins, since in any event it is the nitrogen-containing basic groups of the anionic-exchange resins and the acid groups of the cationic-exchange resins which react with a fatty acid and amine, respectively, to impart the ink-attractive qualities in accordance with the present invention.

In view of the very large number and varying chemical structures of ion-exchange resins which satisfy the foregoing general descriptions and which may accordingly be used in practicing the invention, reference is made for the purposes of the present disclosure to exemplary prior art patents which illustrate more specifically the nature of certain ion-exchange polymers and methods of preparing them.

ANIONIC-EXCHANGE RESINS

In general, the anionic-exchange resins employed are the water-attractive organic, so-called amine resins which have nitrogen-containing basic groups. The nitrogen-containing basic groups of such resins may comprise polymers containing heterocyclic nitrogen having basic properties and $-NH_2$, $-NHR$, $-NR_2$, $-NR_3{}^+OH^-$ basic groups in which R is an organic monovalent radical of one to ten carbon atoms and selected from the group consisting of alkyl and aryl, either saturated or unsaturated. Both aliphatic and aryl substituents may be present in the same basic group. The quaternary ammonium basic groups are preferred because they usually have the strongest basicity.

Amine resins may be produced, for example, by condensing an aromatic amine with an aldehyde. Preferably, the resin condensate is formed from an aryl polyamine and formaldehyde. Amine resins found to be very useful in practicing the invention consist essentially of carbon, hydrogen, oxygen, and nitrogen, all of the nitrogen being present in the defined basic groups or polymers containing heterocyclic nitrogen exhibiting basic properties.

Specific anionic-exchange amine resins which may be used include copolymers of styrene and vinyl pyridine, polyvinyl pyridine, polystyrene containing primary, secondary, or tertiary amino groups, and quaternary ammonium hydroxide groups like those just mentioned in the second immediately preceding paragraph, polymethylene polyamine polymers, polyethylene polyamine polymers, polypropylene polyamine polymers, polybutylene polyamine polymers, phenol-formaldehyde polyamine polymers, melamine-guanidine formaldehyde polyamine polymers, guanidine-formaldehyde polyamine polmers, carboxy methylene phenylamine diamine, and the like. Such polymers are of sufficiently high molecular weight that they are insoluble in the inks employed. The surfaces of such polymerized, ink-insoluble resins may be made completely insoluble and infusible by cross-linking with a small amount of divinyl benzene.

For example, an anionic-exchange resin can be prepared from polystyrene by reacting the polystyrene with chloromethylmethyl ether ($ClCH_2OCH_3$) in the presence of aluminum chloride to introduce one or more chloromethyl groups onto the benzene ring and then reacting with ammonia or an amine to replace the chlorine by an amino group. Reaction with a tertiary amine gives a quaternary ammonium chloride which can be converted to a quaternary ammonium hydroxide by treatment with a bass.

The following United States patents illustrate the foregoing and exemplify still other types of anionic-exchange resins which may be employed.

Patent 2,106,486 discloses condensing m-phenylenediamine with formaldehyde in an acid medium and under such conditions as disclosed to yield a final resinous gel.

Patent 2,246,526 discloses condensing an aldehyde in the presence of a suitable condensing agent with an aryl polyamine derivative which has at least one free amino group and at least one amino group protected from reaction with the aldehyde. After the condensation has been effected, the amino-protecting group is then split off from the condensation product, such as by hydrolysis, to produce a condensation product having at least one free aryl amino group in the molecule.

Patent 2,402,384 discloses nitrogenous resins which are formed by the condensation of a phenol, formaldehyde, and an alkylene polyamine, the alkylene group of which may be interrupted by —NH— to form alkylene chains of at least two carbon atoms between nitrogen atoms. Heating is carried out for a sufficient time to render the resulting resin insoluble in strong dilute acids. The polyamines which may be used in this case as well as in general in the preparation of amine resins include the alkylene polyamines such as ethylene diamine, diethylene triamine, triethylene tetramine, tetraethylene pentamine, N,N'-bis(aminopropyl)ethylene diamine, dipropylene triamine, tris(trimethylene) tetramine, and other polyalkylene polyamines.

Patent 2,442,989 discloses direct condensation of a polyalkylene-polyamine with an aldehyde and a ketone or other substance containing labile hydrogens. This process saves the cost of using acid to neutralize the amine of the alkali needed to neutralize the acid in the final product and enables preparation of the resins without extensive heating. The free polyalkylene-polyamine is simply mixed with the other ingredients in suitable proportions to form a gel.

Patent 2,467,523 discloses the preparation of an anionic-exchange resin by bringing together a polyalkylene-polyamine and a substituted 1,3,5-triazine containing at least two functional groups such as —$NH_2$, —OH, —SH, —O alkyl, —Cl, —Br, —S alkyl, etc.

Patent 2,469,683 discloses condensing an alpha-chlorobeta, gamma-epoxy organic compound, for example, epichlorohydrin with an alkylene polyamine in the form of the free base, by bringing them together in a molar ratio of at least 2:1, respectively.

Patent 2,469,693 discloses condensing an aliphatic polyhalide which contains a hydroxy group in beta position to each of the halogens with an alkylene polyamine. The resulting condensation product is permitted to gel after which the gel is cured by heating and the cured product then granulated.

Patent 2,469,684 discloses condensing a polyepoxy organic compound, for example, bis-(2,3-epoxypropyl) sulfide, with an alkylene polyamine. The condensation product is permitted to gel as previously, after which the gel is cured by heating and then granulated.

Patent 2,473,498 discloses reacting a polyalkylene polyamine, acrylonitrile, and an ammonocarbonic acid, such as cyanamide, dicyandiamide, a guanidine, a biguanide, etc., to form an anionic-exchange resin. The reaction product may be granulated as before.

Patent 2,518,956 discloses reacting a polyalkylene polyamine, an aldehyde and a nitroalkene containing at least two labile hydrogen atoms capable of reacting with formaldehyde to form methylol compounds. The free polyalkylene polyamine is simply mixed with the other ingredients in suitable proportions to form a gel. Extensive heating is unnecessary since the reaction is exothermic.

Patent 2,521,664 discloses condensing a polyamine with an aldehyde and insolubilizing the resulting product with an aminotriazine-aldehyde condensation product, for example, a melamine-formaldehyde condensation product.

Patent 2,522,688 discloses condensing a guanidine or a biguanide with a reactive ketone, insolubilizing the resulting condensation product with an aldehyde and urea or an aminotriazine.

Patent 2,525,227 discloses producing as a gel an anionic-exchange resin by gelling the condensation product of a substance containing a guanido group such as guanidine nitrate with a condensation product of an amino compound such as malamine or urea and an aldehyde such as formaldehyde in the presence of a definite excess of water.

Patent 2,525,480 discloses condensing an aldehyde with a furyl substituted aliphatic amine, permitting the condensation product to gel, curing the gel by heating, and granulating the cured gel.

Patent 2,529,142 discloses reacting an aminotriazine, an aldehyde, and a strongly basic, non-aromatic amine, acidifying the reaction product to a pH of from 2 to 4, drying the acidified product by heating, and granulating the heated, dried product.

Patent 2,531,863 discloses reacting an aldehyde-reactive phenolic compound with an aldehyde and a nitroparaffin and then reducing the nitro groups to amino groups. Patent 2,553,386 is similar except that an aldehyde reactive amino compound is used in place of the phenolic compound.

Patent 2,540,984 discloses copolymerizing a polyvinyl derivative of an aromatic compound, such as divinyl benzene, with a monovinyl derivative of a nitrogen-containing heterocyclic compound, such as vinyl pyridine.

Patent 2,540,985 discloses the quaternary ammonium type of anionic-exchange resin in which the resins are quaternary ammonium derivatives of copolymers of vinyl pyridine and divinyl benzene or trivinyl benzene. Processes of preparing these compounds are also disclosed.

Patent 2,570,822 discloses preparing an anionic-exchange material by the treatment of an organic or resinous material which contains secondary amino groups with an alpha:beta unsaturated aldehyde or ketone and with an aliphatic halogen compound.

Patent 2,591,573 discloses the reaction products of a tertiary amine and an insoluble, cross-linked copolymer of an aromatic monovinyl hydrocarbon and an aromatic divinyl hydrocarbon, which copolymer contains haloalkyl groups having the formula —$C_nH_{2n}X$ in which X is a chlorine or bromine atom and —$C_nH_{2n}$ is an alkylene group in which $n$ is an integer from one to four. The resins are, therefore, insoluble, aromatic, cross-linked vinyl copolymers containing substituent groups having the general formula

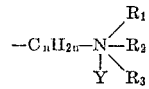

in which $n$ is an integer of value one to four; $R_1$, $R_2$, and $R_3$ are hydrocarbon groups; and Y is an anion, such as a chloride, sulfate or hydroxyl ion. It will be noted that these reaction products are of the quaternary ammonium type.

CATIONIC-EXCHANGE RESINS

In general, the cationic-exchange resins employed are water-attractive organic polymers having reactive acid groups, which preferably are carboxylic, sulfonic, or phosphoric acid groups. These polymers are substantially chemically inert except for the defined acid groups. A desired class of cationic-exchange resins constitutes the aryl polymers and especially those in which the acid groups are nuclear with respect to the aromatic chain of the condensation product. An example of such a resin is the condensation product of phenol and an aldehyde having acid groups nuclear with respect to the benzene ring. Polyvinyl aryl condensation product containing acid groups are very satisfactory as the cationic-exchange resins.

Specific cationic-exchange resins which may be used include sulfonated polystyrene, chlorosulfonated polyethylene, acrylic acid-divinyl benzene polymers, acrylic acid-tri-allyl cyanurate copolymers, partially hydrolyzed polymethyl methacrylate, hydrolyzed acrylonitrile-vinyl chloride polymers, hydrolyzed acrylonitrile-vinyl acetate polymers, hydrolyzed polymethacrylate cyanide polymers and hydrolyzed acrylonitrile-styrene polymers, it being noted that hydrolyzing where indicated provides carboxyl groups.

The following United States Patents illustrate the foregoing and exemplify still other types of cationic-exchange resins which may be employed.

Patent 2,191,853 discloses a cationic synthetic resin of the monohydric and polyhydric phenol-formaldehyde type which is sulfited, for example, by the action of sulfur dioxide, sulfurous acid or silfites.

Patent 2,204,539 in particular discloses the formation of cationic-exchange resins containing nuclear sulfonic acid radicals in their molecule. Such compounds can be produced either from materials which already contain sulfonic acid radicals (such as hydroxybenzene-, naphthalene-, acenaphthene-, or phenanthrene-sulfonic acids), or the resins obtained in the normal way may be after treated with sulfonating agents. In the first case, the aromatic sulfonic acids should be easily condensed with aldehydes. For subsequent sulfonation of resins free of sulfonic groups, those products are chosen which yield difficultly soluble or insoluble sulfonation products. In one example given, hydroxybenzene sulfonic acid is reacted with a solution of formaldehyde.

Patents 2,228,159 and 2,228,160 also disclose condensation products produced by reacting an aldehyde with hydroxybenzene. The cationic-exchange resins of this patent are produced from monohydroxy-benzene, homologous compounds, or its alkali metal salts, by introducing acid groups into the molecule by means of a treatment with sulfites, bisulfites or sulfur dioxide. According to the teachings, the condensation and acidification care carried out under such conditions that water-insoluble products are formed.

Patent 2,340,110 discloses an infusible, insoluble cationic copolymer containing carboxyl groups. In particular, the copolymers are produced from a polymerizable mixture comprising (1) at least one polymerizable compound containing a polymerizable

grouping and at least one other polymerizable grouping, the unsaturated bonds of said polymerizable groupings being nonconjugated with respect to each other, (2) styrene and (3) maleic anhydride, there being at least one mol of styrene for each mol of maleic anhydride present in the polymerizable mixture.

Any suitable method may be used in preparing the insoluble, infusible copolymers. For example, the components may be mixed and polymerized in the presence or absence of a solvent or a dispersion medium for the components by the use of heat, light, or heat and light in the presence or absence of a polymerization catalyst, at atmospheric, subatmospheric or superatmospheric pressure.

Patent 2,340,111 also discloses an infusible, insoluble cationic copolymer containing carboxyl groups. These copolymers are produced from a polymerizable mixture comprising (1) at least one polymerizable compound containing a polymerizable

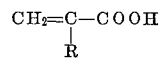

grouping and at least one other polymerizable grouping, the unsaturated bonds of the said polymerizable groupings being non-conjugated with respect to each other, and (2) at least one acrylic acid having the structural formula $$CH_2 = C - COOH$$
$$\phantom{CH_2 = C - }R$$

where R is a substituent selected from the class consisting of hydrogen, chlorine, bromine, monovalent alkyl radicals, monovalent aralkyl radicals, monovalent aryl radicals and monovalent alkaryl radicals. The copolymers may be prepared in the same manner described for Patent 2,340,110.

Patent 2,366,007 discloses compositions of matter comprising sulfonated, cross-linked, insoluble, infusible polymerizates of polyvinyl aryl compounds. The polymerization may be made by polymerizing a polyvinyl aryl compound alone, copolymerizing a plurality of polyvinyl aryl compounds, copolymerizing at least one polyvinyl aryl compound with at least one monovinyl aryl compound copolymerizing a mixture of polymerizable compounds, the major portion of the polymerizable compounds being either at least one polyvinyl aryl compound or at least one polyvinyl aryl compound and at least one monovinyl aryl compound. Illustrative examples of suitable polyvinyl aryl compounds which may be used are: divinyl benzenes, divinyl toluenes, divinyl naphthalenes, divinyl xylenes, divinyl ethyl benzenes, divinyl chlorobenzenes, divinyl-phenyl vinyl ethers.

Illustrative examples of suitable monovinyl aryl compounds which may be used are: styrene (vinyl benzene), vinyl toluenes, vinyl naphthalenes, vinyl ethyl benzenes, alpha-methyl styrene, vinyl chlorobenzenes, vinyl xylenes.

After polymerization is complete, the product is isolated and ground to a granular form. This product is then sulfonated by the use of known sulfonating agents, for example, concentrated sulfuric acid, fuming sulfuric acid, chlorosulfonic acid, etc.

Patent 2,440,669 discloses resinifying a mixture including at least one aldehyde selected from the group consisting of formaldehyde and furfural and a sulfonated compound having the following general formula:

$$R_1 - CH - CHRX$$
$$\phantom{R_1 - CH - }SO_3M$$

in which $R_1$ is a hydroxyaromatic radical of the benzene series, X is an activating group possessing a polar bond selected from the group consisting of —CO-aliphatic, —CO - aromatic, —CO - aliphatic - aromatic, —COOR, —CN, and —NO$_2$, M is selected from the group consisting of metals, hydrogen and —H.NR$_2$R$_3$R$_4$, and R, R$_2$, R$_3$ and R$_4$ are selected from the group consisting of hydrogen and organic radicals. To prepare such resins, for example, a hydroxy benzaldehyde is condensed with a substance containing an active methyl group or an active methylene group and converting the resulting condensation product into a sulfonate by reaction with a bisulfite.

Patent 2,597,438 discloses insoluble cationic-exchange resins of the sulfonic type. These resins are sulfonated polymers of styrene and are most conveniently made by sulfonating polystyrene directly by such sulfonating agents as sulfuric acid.

PREPARATION OF INK-TRANSFER MEMBER

For purposes of illustration, the preparation of a roller, such as inking roller for a lithographic press, is described although it is understood that the present ion-exchange resins may be used on any support member of which it is desired to enhance the hydrophobic, ink-loving, or ink-retentive qualities of any desired area.

In general, the ion-exchange resins may constitute the entire roller, or be molded over a supporting body, or be admixed with a compatible material, as long as a sufficient amount of the ion-exchange resin appears at a desired exposed surface, or portion thereof, to improve the oleophilic properties in a manner described. In forming rollers, the known techniques of molding may be followed. It will be noted that certain of the cited patents refer to forming the resin in a granular form, and the resins are conveniently used in this comminuted state. For example, the resins at a suitable stage of polymerization may be molded in a desired form and then completely cured by the application of heat and pressure. The presence of fillers, plasticizers, cross-linking agents, and the like, are also contemplated to control the ultimate properties of the product such as softness or hardness. Such properties can also be controlled by proper selection of curing conditions such as temperature, pressure and length of cure, as is known in the art. As indicated, the resins may be molded onto a shaft or arbor, or in the case of small rolls a one piece construction may be formed comprising a polymeric material without a metal shaft.

Also, these ion-exchange polymers may be applied as films on a metal surface and there molded in a like manner. In some cases, if desired, the fully polymerized ion-exchange resin may be pulverized and dispersed in a carrier material which is oleophilic and ink-insoluble, such as natural rubber, butadiene-acrylonitrile rubber, vucanizable Engravers' Gum, or the like. On drying the carrier, a sufficient amount of the ion-exchange resins forms at a finished surface.

As indicated, the anionic-exchange resins with their basic nitrogen-containing groups are immediately usable to transmit or retain ink. The functional groups introduced into the high molecular weight ink-insoluble anionic-exchange polymer are basic as indicated and therefore capable of forming salts with fatty acids that are found in printing inks, such as oleic and stearic acids. As a result the ink is highly attracted to the resin surface and there is thereby provided a more satisfactory film of ink than can be obtained on surfaces which do not contain such basic groups. In addition, the present improved surfaces thoroughly repel aqueous solutions.

In the case of cationic-exchange resins, the molded or otherwise shaped article is first treated with an amine which reacts with the acid groups to form an ink-attractive addition product which is then used in the same manner as the article prepared from an anionic-exchange resin. Primary, secondary, and tertiary aliphatic amines can be used for this reaction in which the aliphatic chains are relatively long, that is, similar to the aliphatic chains found in inks. In fact, amines of the type $RNH_2$, $R_2NH$, and $R_3N$ may be used wherein R is an aliphatic group, saturated or unsaturated, containing from 6 to 20 carbon atoms. Preferably, liquid amines are used since the chemical activity of the amines of a greater molecular weight lessens as one approaches the amines having the upper 20 carbon atom limit. For example, the amines of palmitic, stearic, oleic, and linoleic acids may be used. This treatment of the cationic-exchange resins by the defined amines results in the formation of salts of the acid groups and provides a surface which is highly hydrophobic and contains relatively long aliphatic side chains similar to those found in printing inks. This causes the printing ink to be highly compatible with the surface of the roller or other article and results in overall greater ink-attractiveness.

As an additional novel aspect of the present invention, when the press or printing run is ended, an inking roll or other article of the present invention has a new and remarkable function in that by merely applying a cleaning solvent including a mineral acid or strong organic acid, the polarity of the inking roller surface reverses, and ink thereon is repelled. The roller therefore cleans extremely easily and quickly. Such mineral acids as hydrochloric, sulfuric (including acid salts such as sodium bisulfate), nitric acids and such strong organic acids as hydroxy acetic and trichloroacetic acids may be used. The polar nature of the ion-exchange resin thus results in an accentuated ink-attractiveness for printing and a new ease of cleaning after termination of a printing run. Dual functions and manifestly useful and important results are accordingly realized.

In order to demonstrate the invention, the following examples are set forth for the purpose of illustration only. Any specific enumeration or detail mentioned should not be interpreted as a limitation of the invention unless specified as such in one or more of the appended claims and then only in such claim or claims.

Example 1

Acrylic acid and divinyl benzene were mixed in a molar ratio of 10:1, respectively, and heated at a temperature within the range of about 75° C. to about 100° C. for a time to produce a partially polymerized copolymer still sufficiently plastic to undergo a molding operation. The copolymer was then molded into the form of a roller about a steel arbor using apparatus of the type disclosed in United States Patent No. 2,536,323. Upon being released from the mold, a surface of the roller was flushed with an amine of stearic acid. The resulting roller was then ready for immediate installation as an inking roller on a printing press.

Example 2

An anionic-exchange resin was formed as a condensate from the reactants consisting of melamine, guanidine, and formaldehyde. Before the polymerization was completed the resin was formed into a blanket suitable for use on a lithographic press. Since the blanket was to be used with an ink containing fatty acids, the blanket was ready for immediate installation on the press.

Example 3

A roller was formed entirely from acrylic acid triallyl cyanurate copolymer. Since this resin was of the cationic-exchange type, it was first treated with a liquid aliphatic amine for reaction with the acid groups before installation on a printing press.

Example 4

Styrene and vinyl pyridine were heated together at a molar ratio of 3:1, respectively, together with a catalytic amount of a peroxide catalyst. The heating continued at a temperature within the range of about 80° C. to about 100° C. until resinification occurred. The product was then pulverized and molded under heat and pressure in a suitable mold to form an inking roller which could be directly used in a press employing inks containing fatty acids.

Any of the previously disclosed cationic and anionic-exchange resins may be substituted for those of the examples, the techniques and uses of the resulting products being the same in accordance with the foregoing disclosure. All patents previously cited are hereby incorporated by reference.

It is possible to have an article, such as an article designed for use in a lithographic press, actually to be too ink-attractive. Such an article so strikingly and abruptly rejects water that the water may ball on the surface or be forced or carried into unwanted areas of the press. As a modification of the invention, therefore, it is contemplated to add a cationic-exchange resin, unreacted, to an ink-transfer member prepared as previously described to mollify the ink-attractive properties otherwise imparted. The amount of the cationic-exchange resin used is not critical as long as a surface of the article so treated remains predominantly ink-attractive. The addition of the cationic-exchange resin may be accomplished by direct incorporation into the body of the article, after the treatment with the defined amines in the case of the originally employed cationic-exchange resin, or the mollifying cationic-exchange resin may be spread over a surface of an article, some of the resin thus being retained on such surface.

Other forms embodying the features of the invention may be employed, change being made as regards the features herein disclosed, provided those stated by any of the following claims or the equivalent of such features be employed.

I therefore particularly point out and distinctly claim as my invention:

1. In an inking roller for printing, a surface thereon adapted to receive a fatty acid-containing ink, said surface comprising an ion-exchange resin polymerized to an ink-insoluble state, said resin being selected from the group consisting of a copolymer of styrene and vinyl pyridine, and polyvinylpyridine, said ion-exchange resin being reactive with the fatty acid of said ink and thereby providing an ink-attractive surface on said roller.

2. In an inking roller for printing, a surface thereon adapted to receive ink comprising an ion-exchange oleophilic resin consisting essentially of a reaction product of an acid-group containing resin polymerized to an ink-insoluble state with an aliphatic amine selected from the class consisting of $RNH_2$, $R_2NH$, and $R_3N$, wherein R is an aliphatic group containing from 6 to 20 carbon atoms.

3. In an inking roller for printing, a surface thereon adapted to receive ink comprising an ion-exchange oleophilic resin consisting essentially of a reaction product of a resin polymerized to an ink-insoluble state and having an acid group selected from the class consisting of sulfonic, phosphoric, and carboxylic acid groups with an aliphatic amine selected from the class consisting of $RNH_2$, $R_2NH$, and $R_3N$, wherein R is an aliphatic group containing from 6 to 20 carbon atoms.

4. In an inking roller for printing, a surface thereon adapted to receive ink comprising an ion-exchange oleophilic resin consisting essentially of a reaction product of a resin polymerized to an ink-soluble state selected from the group consisting of sulfonated polystyrene and chlorosulfonated polyethylene with an aliphatic amine selected from the class consisting of $RNH_2$, $R_2NH$, and $R_3N$, wherein R is an aliphatic group containing from 6 to 20 carbon atoms.

5. A method of improving the ink-attractive properties of an inking roller for printing comprising the steps of forming an inking surface from an ion-exchange resin polymerized to an ink-insoluble state, said resin being selected from the group consisting of a copolymer of styrene and vinyl pyridine, and polyvinylpyridine, then applying over the ion-exchange resin a printing ink containing a fatty acid, and reacting such resin with such fatty acid.

6. A method of improving the ink-attractive properties of an inking roller for printing comprising the steps of forming an inking surface from an acid-group containing resin polymerized to an ink-insoluble state, and then reacting such polymer through said acid-group with an aliphatic amine selected from the group consisting of $RNH_2$, $R_2NH$, and $R_3N$, wherein R is an aliphatic group containing from 6 to 20 carbon atoms.

7. A method of improving the ink-attractive properties of an inking roller for printing comprising the steps of forming an inking surface from a resin polymerized to an ink-soluble state and having an acid group selected from the class consisting of sulfonic, phosphoric, and carboxylic acid groups, and then reacting such polymer through such acid groups with an aliphatic amine selected from the class consisting of $RNH_2$, $R_2NH$, and $R_3N$, wherein R is an aliphatic group containing from 6 to 20 carbon atoms.

8. A method of improving the ink-attractive properties of an inking roller for printing comprising the steps of forming an inking surface from a resin polymerized to an ink-insoluble state and selected from the group consisting of sulfonated polystyrene and chlorosulfonated polyethylene, and then reacting such polymer with an aliphatic amine selected from the group consisting of $RNH_2$, $R_2NH$, and $R_3N$, wherein R is an aliphatic group containing from 6 to 20 carbon atoms.

9. The method of using an inking roller comprising the steps of applying to the surface of the printing roller an amino-polymeric ion-exchange oleophilic resin, then applying ink to such oleophilic resin, and subsequently cleaning the surface of such roller by applying to such surface an acid selected from the group consisting of a mineral acid and a strong organic acid to reverse the polarity of such ion-exchange oleophilic resin to make such roller ink-repellent and thereby assist in the cleaning thereof.

10. An ink-transfer member comprising a supporting body having a surface adapted to effect such ink transfer, said surface comprising in sufficient amount to enhance the hydrophobic and oleophilic qualities thereof an ink-attractive ion-exchange resin polymerized to an ink-insoluble state selected from the group consisting of a cationic resin consisting essentially of an organic polymer having acid groups reacted with an aliphatic amine selected from the group consisting of $RNH_2$, $R_2HN$, and $R_3N$ wherein R is an aliphatic group containing from 6 to 20 carbon atoms, and an anionic-exchange amine resin having nitrogen-containing basic groups reacted with fatty acids contained in printing inks.

11. The ink-transfer member of claim 10 wherein the acid groups of said cationic-exchange resin are selected from the group consisting of carboxyl, sulfonic, and phosphoric acid groups.

12. An ink-transfer member adapted to receive a fatty acid containing ink comprising a supporting body having a surface adapted to effect such ink transfer, said surface comprising in sufficient amount to enhance the hydrophobic and oleophilic qualities thereof an ink-attractive reaction product of the fatty acid of said ink and nitrogen-containing basic moieties of a polymeric anionic-exchange amine resin, said basic moieties being selected from the class consisting of polymers containing heterocyclic nitrogen having basic properties and —$NH_2$, —NHR, —$NR_2$, and —$NR_3{}^+OH^-$ basic groups in which R is a monovalent radical selected from the group consisting of aliphatic radicals having from 1 to 10 carbon atoms and aryl radicals having from 6 to 10 carbon atoms.

13. The ink-transfer member of claim 12 wherein said anionic-exchange amine resin is a condensation product of an aromatic amine and an aldehyde.

14. The ink-transfer member of claim 12 wherein said anionic-exchange amine resin is a condensation product of an aryl polyamine and formaldehyde.

15. The ink-transfer member of claim 12 wherein said anionic-exchange amine resin consisting essentially of carbon, hydrogen, oxygen, and nitrogen and all nitrogen is present in the defined basic moieties.

16. A method of providing an improved ink-transfer member comprising providing at a surface of such member an ink-attractive ion-exchange resin to enhance the hydrophobic and oleophilic qualities thereof, said resin being polymerized to an ink-insoluble state and consisting essentially of an ion-exchange amine resin having nitrogen-containing basic groups, then applying over the anionic-exchange resin a printing ink containing fatty acid, and reacting such resin with such fatty acids.

17. A method of improving the ink-attractive properties of an ink-transfer member comprising the steps of forming an inking surface thereon from an ion-exchange resin polymerized to an ink-insoluble state, said resin being an anionic-exchange amine resin having nitrogen-containing basic moieties selected from the class consisting of polymers containing heterocyclic nitrogen having basic properties and —$NH_2$, —NHR, —$NR_2$, and

—$NR_3^+OH^-$ basic groups in which R is a monovalent radical selected from the group consisting of aliphatic radicals having from 1 to 10 carbon atoms and aryl radicals having from 6 to 10 carbon atoms.

18. The method of claim 17 wherein said anionic-exchange amine resin is a condensation product of an aromatic amine and an aldehyde.

19. The method of claim 17 wherein said anionic-exchange amine resin is a condensation product of an aryl polyamine and formaldehyde.

20. A method of improving the ink-attractive properties of an ink-transfer member comprising the steps of forming an inking surface thereon comprising an oleophilic, ink-attractive reaction product, said reaction product being selected from the group consisting of a reaction product formed from an acid-group containing resin polymerized to an ink-insoluble state and an aliphatic amine selected from the class consisting of $RNH_2$, $R_2NH$, and $R_3N$, wherein R is an aliphatic group containing from 6 to 20 carbon atoms, and a reaction product formed from a fatty acid and a polymeric anionic-exchange amine resin.

21. The method of claim 20 in which such inking surface is treated with an acid group containing cationic exchange resin to mollify the ink attractive properties thereof.

References Cited

UNITED STATES PATENTS

| 2,302,037 | 11/1942 | Kollek | 101—395 XR |
| 2,681,310 | 6/1954 | Wood | 204—38 |

FOREIGN PATENTS 581,410  10/1946  Great Britain.

DAVID KLEIN, *Primary Examiner.*

U.S. Cl. X.R.

29—132; 101—335, 395; 260—2.1, 2.2